United States Patent [19]

Prox

[11] 4,408,159

[45] Oct. 4, 1983

[54] PROXIMITY SENSING HEAD

[75] Inventor: Rolf Prox, Mettmann, Fed. Rep. of Germany

[73] Assignee: Abex Corporation, New York, N.Y.

[21] Appl. No.: 250,516

[22] Filed: Apr. 2, 1981

[51] Int. Cl.³ .............................................. G01V 3/11
[52] U.S. Cl. ................................... 324/207; 324/236; 336/90
[58] Field of Search ............... 324/206, 207, 208, 209, 324/224, 225, 236; 336/90, 92, 94, 177; 340/658, 688; 361/180, 203; 29/602 R, 606, 607

[56] References Cited

U.S. PATENT DOCUMENTS 3,541,394 11/1970 Brenneman et al. ........... 324/207 X
3,707,671 12/1972 Morrow et al. ................ 342/236 X

*Primary Examiner*—Siegfried H. Grimm
*Assistant Examiner*—W. R. Paxman
*Attorney, Agent, or Firm*—Thomas S. Baker, Jr.; David A. Greenlee

[57] ABSTRACT

A proximity sensor includes a housing having one compartment which houses the components of an oscillator control circuit and another compartment which houses a sensing head including a ferrite core and oscillator coil assembly. An end cap closes the open end of the sensing head compartment. A fluid passage is provided in the end cap which permits fluid to flow around the oscillator coil assembly. A relatively thick seal assembly is interposed between the one compartment and the oscillator coil assembly to prevent the passage of fluid into the one compartment.

2 Claims, 2 Drawing Figures

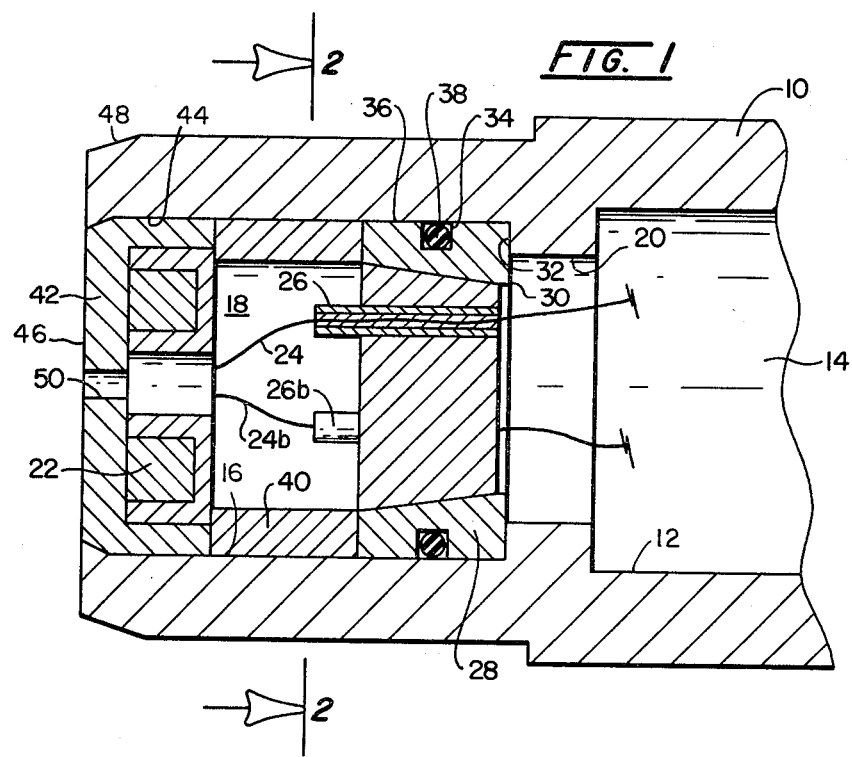
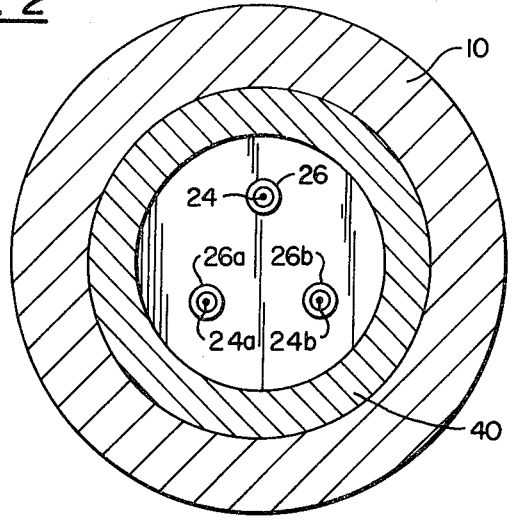

PROXIMITY SENSING HEAD

BACKGROUND OF THE INVENTION

This invention relates to a proximity sensor and, more particularly, to an improved sensing head for such a sensor.

There are many instances in which it is necessary to have a device which will sense the presence or absence of an element. One example of such an instance is where a valve is used to control a positioning device, such as a hydraulic cylinder. In this instance, a sensing device may be attached to the end of the valve to sense the end position of the valve spool in order to determine the direction in which the cylinder is being actuated. For example, if the sensing device detects the presence of the spool, which indicates the cylinder is being moved in one direction, the sensing device will put out one signal, whereas if the device does not detect the presence of the spool, it puts out another signal.

It is possible to sense the end position of a valve spool through the use of a push pin type mechanical limit switch. A mechanical limit switch is suitable when it is used in a dry atmosphere and is not subjected to any extreme temperatures or pressures. However, in many applications a proximity sensor must be submerged in hydraulic fluid, which fluid may be under considerable pressure and at an elevated temperature. Additionally, the sensor may also have to detect high cycling rates, such as 2 or 3 cycles per second. It is difficult to design a push pin type of mechanical device which will operate satisfactorily under such conditions. This is because the push pin has to be sealed to prevent the intrusion of the hydraulic fluid into the switch. Furthermore, the unbalanced condition of the push pin resulting from a pressure above ambient must also be compensated for. In most push pin mechanical switches used in a wet atmosphere an overflow oil line must be connected to the inside of the switch to drain the fluid which leaks into it, since it is almost impossible to make the push pin leak proof.

In order to overcome the disadvantages of mechanical push pin type switches in applications requiring the use of a proximity sensor in a wet atmosphere, or under increased temperature and pressure, a pressure proof inductive type proximity sensor is commonly used. One type of inductive type proximity sensor currently in use consists of a transistorized oscillator circuit which is detuned by the presence of metal. When there is no metal within the range of the electromagnetic field adjacent the active face of the sensing head, the circuit oscillates. When metal is placed within the range of the electromagnetic field, the circuit develops a relatively high resistance and oscillation ceases. In some sensors, the difference in current through the circuit between the oscillating and non-oscillating conditions is monitored by a trigger amplifier and relay to give a definite switch point. That is, the switch is open or closed depending upon whether or not the circuit is oscillating. Other types of proximity sensors utilize circuitry in which a demodulator senses the changes in amplitude or frequency of the oscillating circuit.

In pressure proof proximity sensors currently in use, it is common to have a sensing head in which a ferrite core, oscillator coil and other circuit components are positioned in a cylindrical compartment in the sensor body and the compartment is closed by a thin end cap which is welded to the body or is sealed by means of an O-ring. The end cap must be relatively thin, i.e., 1.0 to 1.5 mm. to enable the core and coil assembly to get close enough to the element being sensed. A problem with this arrangement is that at a dynamic pressure of approximately 350 bars, a typical thin ceramic or plastic end cap having a diameter of 10 to 11 mm. begins to flex and ultimately either ruptures and leaks oil into the circuit components, or the flexure causes damage to the core or oscillator coil or to the wire connections. Further, the strength of the end cap decreases when the temperature of the hydraulic fluid is above 50° C. Consequently, when the temperature of the fluid is increased or the dynamic pressure of the fluid is increased, the life of the sensor in terms of number of cycles is significantly reduced.

It is desirable to provide a sealing arrangement which can withstand dynamic pressures of up to or above 350 bars, tolerate hydraulic fluid which has a temperature above 50° C. and has a cycle life significantly greater than has heretofore been obtainable.

SUMMARY OF THE INVENTION

The instant proximity sensor includes a housing having a pair of compartments. One compartment houses the components of an oscillator control circuit and the other compartment houses a sensing head which includes a ferrite core and oscillator coil assembly. An end cap closes the open end of the sensing head compartment. A fluid passage is provided in the end cap which permits fluid to flow around the oscillator coil assembly to thereby pressure balance the assembly. A relatively thick seal assembly is interposed between the one compartment and the oscillator coil assembly to prevent the passage of fluid into the one compartment.

DESCRIPTION OF THE DRAWINGS

FIG. 1 is an axial section through the sensing head of the proximity sensor of the instant invention; and FIG. 2 is a view along line 2—2 of FIG. 1.

DESCRIPTION OF THE PREFERRED EMBODIMENT

Referring to FIG. 1 of the drawings, the inductive proximity sensor of the instant invention includes a generally cylindrical housing 10 which has a bore 12 at one end which defines a first cavity 14 and a second bore 16 in the opposite end which defines a second cavity 18. The cavities 14, 18 are connected by a bore 20. The components forming a transistorized oscillator control circuit exclusive of the sensing head are housed in the first cavity 14. The components in the second cavity 18 constitute the sensing head of the proximity sensor.

The components of the sensing head of the proximity sensor in cavity 18 include a ferrite core and oscillator coil assembly 22. A trio of wires 24, 24a and 24b from the coil assembly 22 are soldered onto three leads 26, 26a and 26b in a ceramic pressure insulator 28. The leads 26, 26a and 26b are connected to the components of the oscillator control circuit, not shown, in cavity 14.

One side 30 of seal assembly 28 seats against a shoulder 32 in the bottom of bore 16. A groove 34 is formed in the outer surface 36 of seal assembly 28 and an O-ring 38 mounted in the groove 34 seals between the bottom of groove 34 and the wall defining bore 16 to prevent the passage of fluid from cavity 18 through bore 20 into cavity 14. The seal assembly 28 is constructed of a ceramic material having a thickness of approximately 5 mm., which is able to withstand dynamic fluid pressures in excess of 350 bars and fluid having a temperature in excess of 50° C.

The ferrite core and oscillator coil assembly 22 are spaced from seal assembly 28 by a cylindrical spacer 40. A cylindrical end cap 42 has an internal bore 44 which receives the outer surface of the core and oscillator coil assembly 22 and has an end wall 46 which substantially closes the open end of bore 16. The end 48 of the sensor housing 10 is crimped over to retain end cap 42, spacer 40 and seal assembly 28 in cavity 18.

A bore 50 is formed in end cap 42 to permit fluid acting on the outside of end cap 42 to flow into cavity 18 to thereby pressure balance the oscillator coil assembly 22. The fluid in bore 50 flows in the clearance between the core and oscillator coil assembly 22 and the internal bore 44 of end cap 42 to reach the inside of cavity 18. In this manner the core and oscillator coil assembly 22 is completely pressure balanced as is end cap 42. The fluid in cavity 18 is prevented from flowing into cavity 14 which houses the remaining components of the oscillator control circuit by means of the ceramic seal assembly 28 and O-ring 38, as previously described.

The bore 50 in end cap 42 should not exceed 0.5-0.8 mm. in order to limit the rate of pressure rise within the cavity 18. Furthermore, if the bore 50 is too large it is possible that some distortion of the magnetic field generated by the coil assembly 22 may occur. End cap 42 may be constructed of nylon, ceramic, glass or any other material which cannot interrupt a magnetic field.

The remaining components which form the transistorized oscillator control circuit located in cavity 14 may be potted in an epoxy compound in order to protect them. Further, an amplifier and an amplifier relay can be mounted in cavity 14 or external to the subject proximity sensor if they are required.

Although a preferred embodiment of the invention has been illustrated and described, it will be apparent to those skilled in the art that various modifications may be made without departing from the spirit and scope of the present invention.

I claim:

1. An inductive proximity sensor which comprises a sensor housing, a first cavity formed in one end of the housing, a second cavity formed in the housing adjacent the first cavity, a plurality of components forming an oscillator control circuit positioned in the second cavity, a sensing head positioned in the first cavity, the sensing head including an oscillator coil assembly and a cover which closes the first cavity, a seal assembly positioned between the oscillator coil assembly and the second cavity, a fluid passage between the outside of the housing and the first cavity to permit fluid to flow into the first cavity and around the coil assembly to thereby pressure balance the coil assembly, and wherein the seal assembly prevents the passage of fluid from the first cavity into the second cavity.

2. The proximity sensor of claim 1, wherein the seal assembly is significantly thicker than the cover to prevent flexure of the seal assembly due to relatively high dynamic pressures.

* * * * *